United States Patent [19]

Petterson et al.

[11] Patent Number: 5,059,378
[45] Date of Patent: Oct. 22, 1991

[54] SYSTEM FOR ADAPTING HEAT SHRINKABLE FIBROUS STRUCTURES TO PARTICULAR USES

[75] Inventors: Dewitt R. Petterson, Dover; Charles E. Kramer, Walpole; Francis A. DiTaranto, Plainville, all of Mass.

[73] Assignee: Albany International Corp., Albany, N.Y.

[21] Appl. No.: 483,565

[22] Filed: Feb. 22, 1990

[51] Int. Cl.$^5$ .......................... B32B 1/00; B32B 5/02; B32B 5/06; B32B 5/14

[52] U.S. Cl. .................................. 264/258; 156/85; 156/86; 156/148; 264/123; 428/34.9; 428/36.2; 428/113; 428/119; 428/152; 428/161; 428/166; 428/170; 428/172; 428/174; 428/286; 428/287

[58] Field of Search ............... 428/113, 198, 152, 161, 428/166, 170, 172, 119, 174, 286, 287; 156/85, 86, 148; 264/113, 123, 258

[56] References Cited

U.S. PATENT DOCUMENTS

| 3,917,448 | 11/1975 | Wood | 156/622 |
|---|---|---|---|
| 4,172,172 | 10/1979 | Suzuki et al. | 428/288 |
| 4,237,180 | 12/1980 | Jaskowski | 428/288 |
| 4,999,232 | 3/1991 | Le Van | 428/113 |

FOREIGN PATENT DOCUMENTS 2217355 10/1989 United Kingdom .

Primary Examiner—James C. Cannon
Attorney, Agent, or Firm—Jerry Cohen

[57] ABSTRACT

Composite product of adjacent interconnected layers of heat shrinkable fibers, made by heat shrink processing of interconnected such layers of differential shrinkage properties.

12 Claims, 5 Drawing Sheets

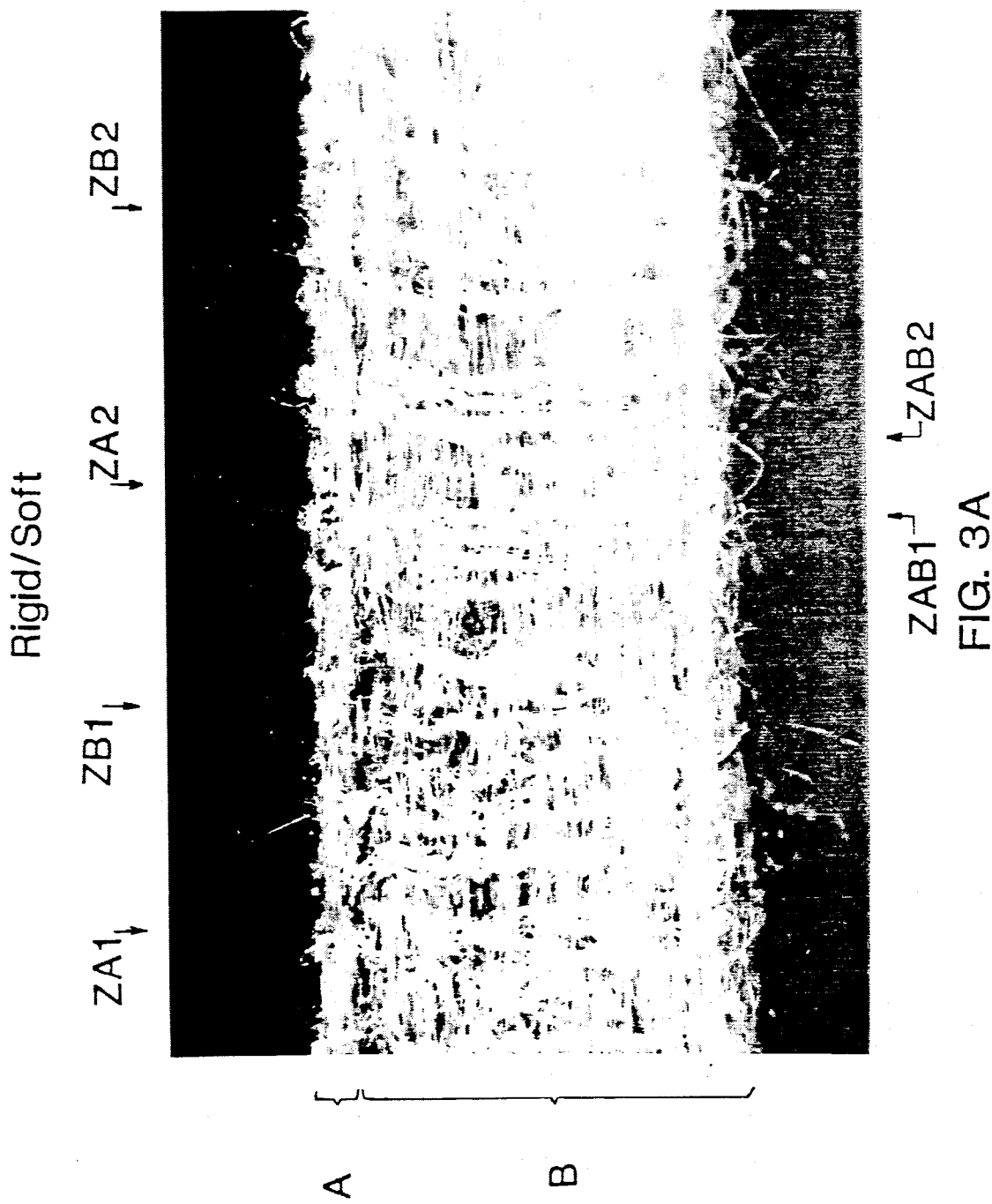

SYSTEM FOR ADAPTING HEAT SHRINKABLE FIBROUS STRUCTURES TO PARTICULAR USES

FIELD OF THE INVENTION

The present invention relates to structural or filler devices —i.e., batts, blocks, rods, cylinders and sheets (and other device forms) made of synthetic fibers exhibiting high temperature resistance, high strength and/or high modulus of elasticity. The invention is more particularly directed to devices of the class described above and apparatus and method combinations utilizing the same in relation to acoustic, electrical and/or thermal insulation; paneling (as a liner, facing or free standing panel); filtering; particle-suspending; filler; flame retarding; strengthening and/or stiffening; impact/vibration absorbing; and/or other functions. The invention is also more particularly directed to methods of constructing such devices as mass production standard commodities and for customized adaptation of the same to particular uses.

BACKGROUND OF THE INVENTION

We have, in past patenting and commercial activity, presented devices of the class first described above (and related methods and apparatus) wherein stretched, heat shrinkable, non-metallic fibers are used in particular laid-up constructions and shrink processed to yield slabs, sheets or batts (or other structures) made up of self-bonded fibers. The end product slabs, sheets or batts have a selected high density compared to the original layup (but low compared to equivalent thickness and equivalent porosity ceramic or metal or fiber-reinforced-matrix structures). The fibers or a major portion thereof in any such device, are preferably selected from the group of heat shrinkable polymers consisting of polyamides, polyimides, acrylics, polypropylene (and higher polyolefins), polyphenylene sulfide, polyetherimide, aromatic ether ketones and the like, with up to five weight percent content of plasticizing material integral to such fibers (preferably made of oligomers of the fiber's basic polymer species). Our prior work is described, e.g., in published U.K. Pat. Appl. 2217355, in non-patent literature and embodied in commercial devices known under the trademarks PYROPEL, of Albany International Corporation.

The disclosures of the foregoing referenced publications and other items are incorporated herein by reference as though set out at length herein.

It is an object of the present invention to enhance the effective utilization of devices of the class first cited above.

It is a further object of the invention to provide a system for matching mass production and custom tailoring needs.

It is a further object of the invention to provide a new class of dimensionally stable, flame resistant, high strength, light weight and insulating materials.

SUMMARY OF THE INVENTION

The invention utilizes multiple layers, each made of heat shrinkable fibers of substantially differing shrinkage characteristics in distinct but cooperating groups, generally as adjacent layers made of different such fibers—i.e. layers A-B using fibers a and b, respectively. The adjacent layers are interconnected, as hereinafter described, and then shrink processed together to yield a composite product with structurally distinct adjacent layers that are compatible with each other and in tandem impart distinct characteristics to the composite product.

Each component layer, group of layers, or the like, experiences a processing essentially as described in published U.K. patent application 2,217,355. First, various component fiber batts are prepared by fiber carding, air laying, wet laying or any other batt-making process known in the art. Second, layers are interconnected by reorienting some of the fibers in each layer in the z-direction by needling, hydroentanglement or any other process known to the art. Third, the felt structure comprised of interconnected layers is restrained about its periphery and subjected to a thermal treatment sufficient to induce considerable fiber shrinkage especially among fibers oriented in the unrestrained z-direction. This process yields densified structures containing dense z-axis pillars of shrunken fibers that have bonded together at fiber-to-fiber cross over points.

It is an important difference compared to our prior single layer processing (or processing of stacked, but not interconnected, similar layers), that in multi-layer processing according to the present invention (processing of interconnected layers of different shrinkage characteristics), the two adjacent layers are interneedled to a substantial extent. That is, fiber-directing, barbed or fluted needles pass through the thicknesses of both layers and in a high density of needle penetrations through the stacked layers.

The modes of differentiating and otherwise controlling shrinkage characteristics and respective end product properties are fiber composition selection, fiber preparation and history, including pre-stretching and heat treatments, type and frequency of the z-axis pillars, and thickness and (x, y) fiber density of the original layers. Of these, the most significant mode is the type of fiber and frequency of z-axis pillars. Physical restraint of some portions of the layers during shrinkage (e.g., holding side edges of sheet materials in a frame during heating and heat treatment conditions are also very significant control methods.

The invention can be applied to in-situ production of curved end products, e.g., as pipe wrappings using the pipe itself as a mandrel during processing, or used for other shaped or flat end products.

The invention can be applied in multiples of basic modules for greater flexibility of design. For example, consider a non-woven needle felt fabric's component layers A and B of thicknesses of ½ inch each as laid up and needled, with A shrinkable to ¼ inch and B not shrinkable under common shrink processing. It is also feasible to provide such a felt wherein A and B are both shrinkable but to different degrees of shrinkage, e.g. a 2:1 thickness shrinkage of one such layer and 5:1 of the other.)

Instead of the basic single module A-B composite described above, one can make A-B-i-B-A or B-A-i-B-A four layer/two module composites, or A-B-i-A or B-A-i-B three layer/two module composites, where i is an interconnection means such as an adhesive or a further array of light density of interconnecting needled fibers between two basic modules. Three or more modules can be provided in a single product. Such elaboration of the basic A-B pattern enlarges the range of composite products' properties (e.g., stiffness, thermal insulation and/or acoustic insulation) that can be provided. It is also possible, but less preferred because of complexity of control, to provide expanded modular composite units of more than two layers per module, e.g. A-B-A, A-B-C in a single such module or a multimodular arrays, e.g. A-B-A-i-A-B-A-i-A-B-C with a first three layer module, second three layer module, etc.

While the discussion of the invention hereinafter is explained in terms of utilization of polyimide as the heat shrinkable polymer fiber to be use, it will be understood that other heat shrinkable fibers can be employed, including polyamides, polyesters, acrylics, polypropylene and higher polyolefins), polyphenylene sulfide, polyetherimide, aromatic ether ketones and the like.

The composite products can be subjected to molding, bending, piercing, coating, assembly and other manufacturing or installation steps after heat shrink processing as outlined above. Alternatively some of such steps can be integrated with heat shrink processing.

Other objects, features, and advantages will be apparent from the following detailed description of preferred embodiments taken in conjunction with the accompanying drawing in which:

BRIEF DESCRIPTION OF THE DRAWING

FIGS. 3-1 and 3-2 are photomicrographics of cross-sections of material produced as indicated in FIGS. 1 and 2, respectively.

DETAILED DESCRIPTION OF PREFERRED EMBODIMENTS

The following two non-limiting examples illustrate practice of the invention in two (A-B) and three (A-B-C) layer versions.

EXAMPLE I

A-B Module (two layers)

An A-B module was prepared as a flat sheet comprised of two different polyimide fiber layers.

The fiber chosen for use in the A-layer was 2.2 dtex, 60 mm high-shrink Lenzing P84 staple fiber. The fiber chosen for use in the B- layer was 5.5 dtex, 60 mm low-shrink Lenzing P84 staple polyimide fiber. Both fibers are commercially available. High-shrink P-84 fiber was carded and lightly needled approx. 500 penetrations/square in.) to form a batt weighting 7 ounce/square yard. Low shrink P84 fiber was similarly processed into a batt weighing 13 oz/square yard.

A layer of the high shrink P84 batt was needled a total of 6,000 penetrations/square in. to a final thickness of 0.09". A layer of the low shrink P84 batt was attached to the high shrink felt by needling through the low shrink batt into the high shrink layer at 250 penetrations/square inch. The resulting two-layer felt had a thickness of 0.33 inch, a basis weight of 18 ounce/square yard, and a density of 4.5 lb./cubic foot.

The layered felt was restrained in the plane of the fabric using a rigid metal frame. The restrained felt was subjected to a thermal treatment of one hour at 630 degrees F. The resulting structure was a flat sheet of 0.28 inch thickness comprised of a thin dense and flexure-capable but essentially rigid layer (Layer A) joined to a thick lofty non-rigid (compared to A) layer (Layer B). The thickness and density of each layer and the complete structure are reported in Table I-1.

TABLE I-1

|  | Thickness (in.) | Density (lb/cu. ft) |
|---|---|---|
| Layer A | 0.04 | 10.2 |
| Layer B | 0.24 | 5.0 |
| Module A-B | 0.28 | 5.7 |

Thus Layer A had essentially a 2:1 thickness shrinkage (from, 0.09 inch to 0.04 inch) while Layer B had minimal shrinkage. Such a product is useful in thermal insulation afforded primarily by Layer B with special benefit in assembly and protection due to the high shrink layer.

Figure 1:
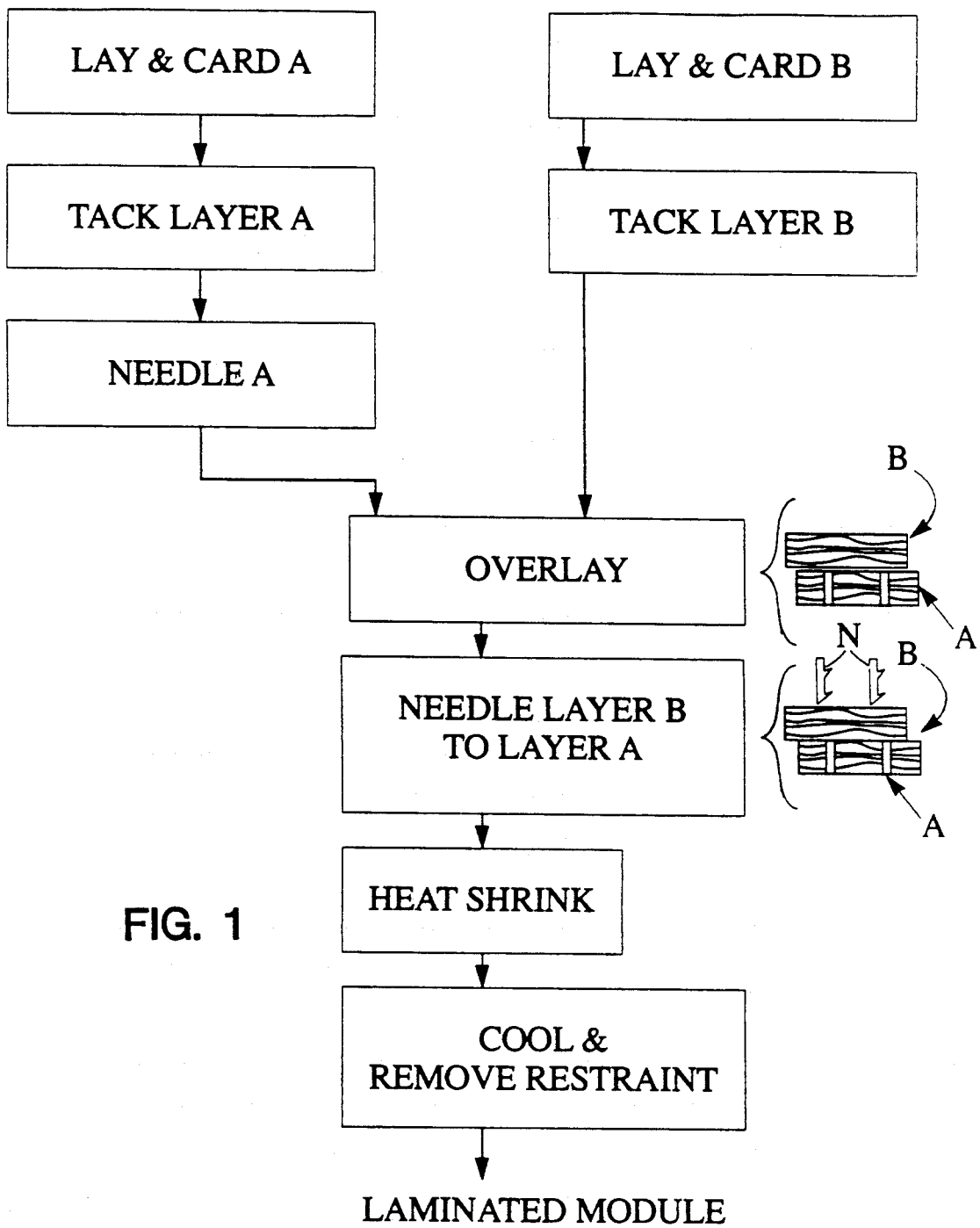
FIGS. 1 and 2 are block diagrams of practice of two preferred embodiments of the invention.

The foregoing processing is represented by the block diagram of FIG. 1.

EXAMPLE II

A-B- Module (three layer)

An A-B-C module was prepared as a flat sheet comprised of three different layers of polyimide fiber.

The fiber chosen for use in A- and C- layers was 2.2 dtex, 60 mm high-shrink Lenzing P84 staple fiber. The fiber chosen for use in Layer B was 5.5 dtex, 60 mm., low-shrink Lenzing P84 staple fiber. High shrink P84 fiber was carded and lightly needled (about 500 penetrations/square in.) to form batts of 4 and 10 oz/square yard. Low shrink P84 fiber was converted into a lightly needled batt weighing 18 ounce/square yard.

Two pieces of low shrink batt were needled together to form Layer B. This was accomplished by passing the batts through a needle loom twice at 250 penetrations/square inch per pass. The high shrink fiber layers were attached in separate operations. The 4 ounce/square yard high shrink batt was placed on Layer B and attached by needling through the high shrink fiber into the low shrink fiber at 250 penetrations/square inch forming Layer A. The 10 ounce/square yard high shrink batt was placed on the other side of Layer B and needled through the high shrink fiber into the low shrink fiber layer at 250 penetrations/square inch. The resulting three-layer felt had a basis weight of 52 ounce/square yard and a total thickness of 0.85".

The layered felt was restrained in the plane of the fabric using a rigid metal frame. The restrained felt was subjected to a thermal treatment of one hour at 630 degrees F.

The resulting structure was a flat sheet comprised of three layers differing in thickness and density as reported in Table II-2. In this module, the density of the different layers did not differ greatly, but the thin high shrink fiber layers (Layers A and C) provided smooth even surfaces.

TABLE II-2

|  | Thickness (in.) | Density (lb/cu. ft) |
|---|---|---|
| Layer A | 0.04 | 9.1 |
| Layer B | 0.31 | 10.0 |
| Layer C | 0.07 | 10.9 |
| MODULE A-B-C | 0.42 | 10.1 |

Figure 2:
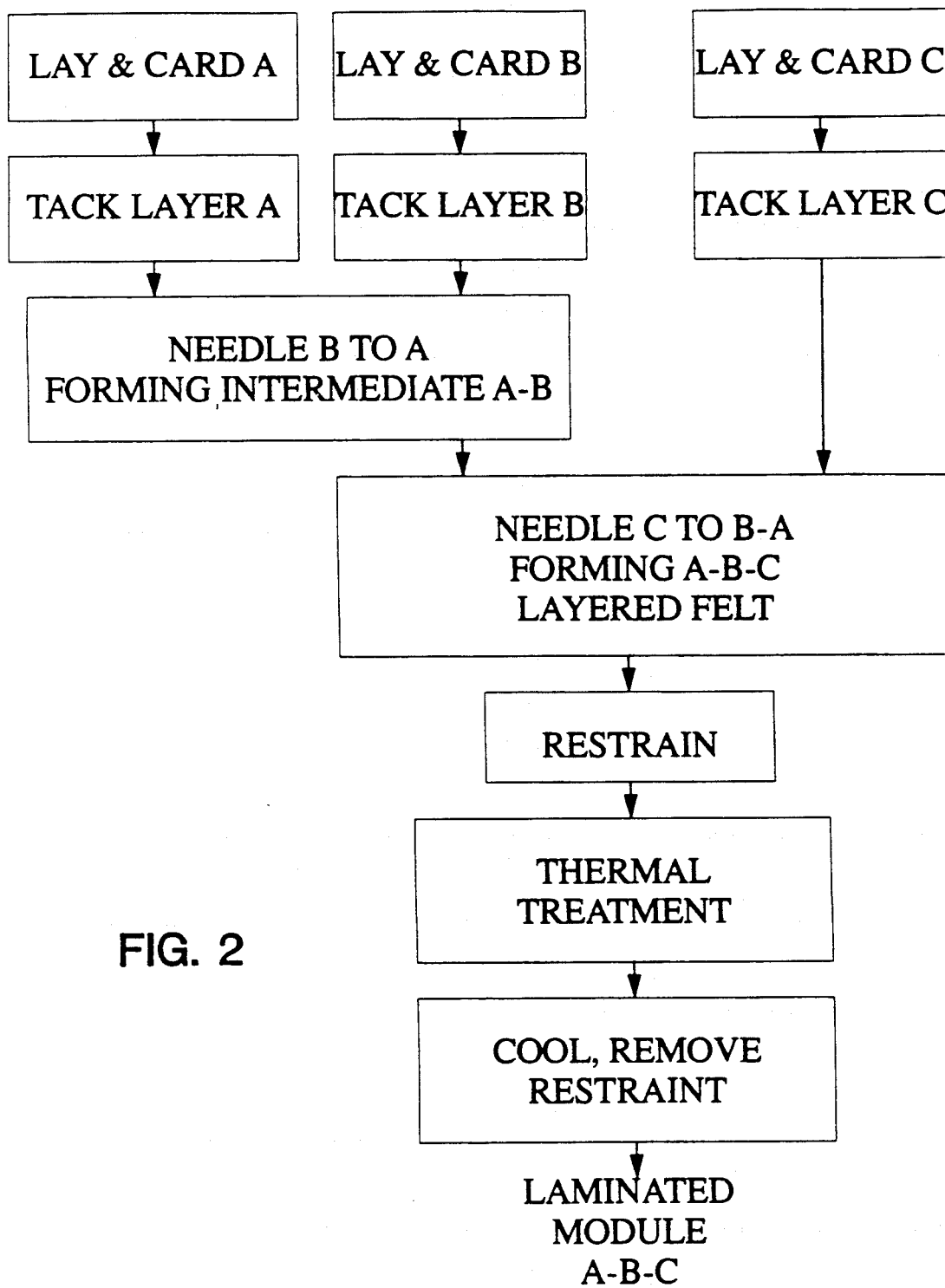

The foregoing processing is represented by the block diagram of FIG. 2.

Figure 3B:
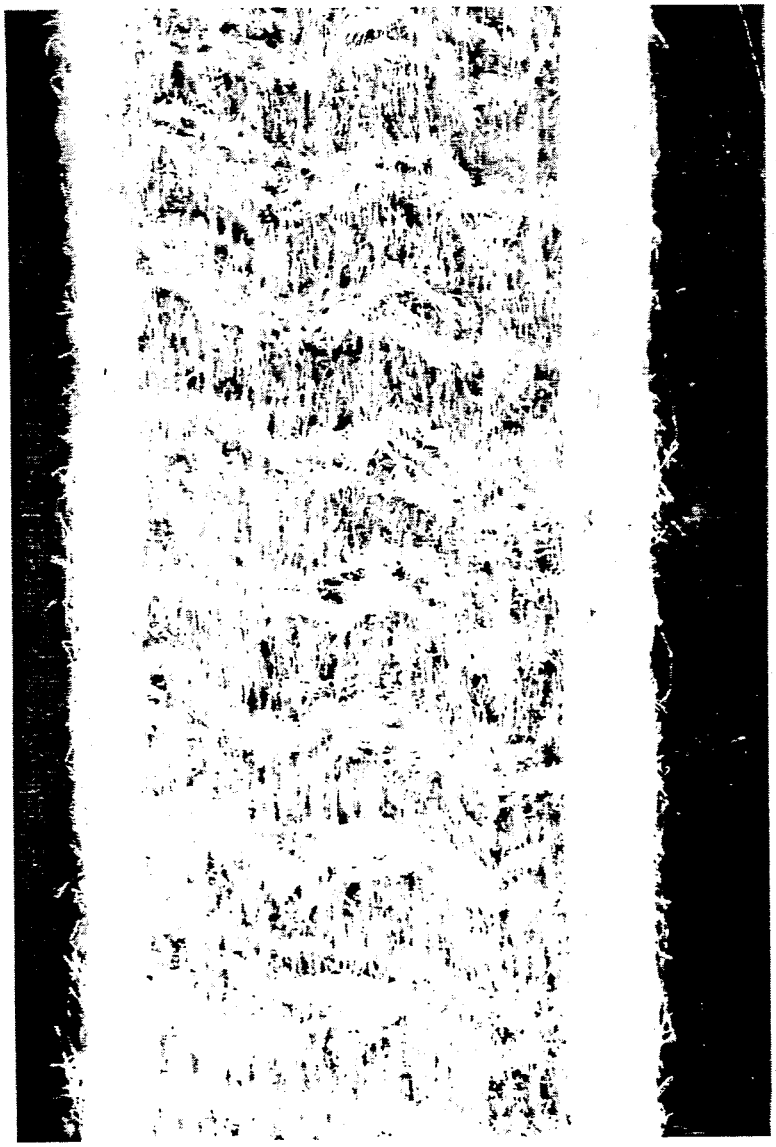

FIGS. 3-1 and 3-2 are photomicrographs of transverse sections at 8 and 10× magnification, respectively, of a two-layer laminate produced substantially as in Example 1 above (-1) and of a three layer laminate produced substantially as in Example 2 above (3-2). Z-axis pillars are seen in FIG. 3-1 within layers A and B, i.e. ZA1, ZA2, ZB1, ZB2 and spanning Z-axis pillars are also observable ZAB1. Penetration is not necessarily through the full thickness of either or both layers. Similarly, Z-axis pillars are indicated for FIG. 3-2, i.e. ZA1, ZB1, ZC1, ZAB, ZBC1.

The fibers are preferably polyimides and more particularly polymers composed of structural units of the general formula:

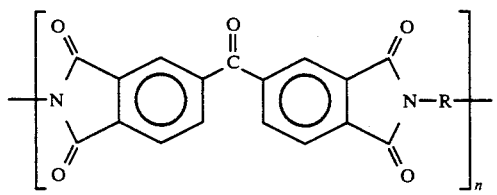

(I)

where R is:

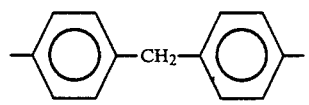

(II)

and/or where R is:

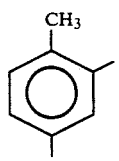

(III)

or

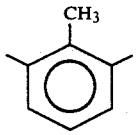

(IV)

Minor amounts (preferably not more than 5 weight per cent) of plasticizing material can be included in the fiber. Such plasticizers may be solvents for the polymer (e.g., dimethylformamide, n-methyl pyrrolidone or dimethyl acetamide as solvents for polyimide) and/or low molecular weight oligomers of the same polymer.

The lay-up of fibers involves separating and dispersing the fibers in webs by fiber carding, air laying, wet laying or some other process known to the art and stabilizing these webs by light needling (tacking) or some other means known to the art to form batts. One or more sheets of a selected composition are used to form a layer and these are combined via needling, hydroentanglement or some other process known to the art for combining fibrous webs. Fibrous layers (each comprised of sheets or groups of attached sheets) are combined in a subsequent step using needling, hydroentanglement or some other process to form layered felts suitable for use in this invention. The type and extent of the needling process (or other process designed to reorient fiber in the z-direction) determines the location and characteristics of the z-axis needle tracks which span layers of fibers oriented in the x- and y-directions. The z-axis needle tracks, which will correspond to pillars in the thermally treated products, are usually of higher densities (frequencies of occurence) than the sheet areas surrounding each such pillar, normally in a ratio of 2:1 to 3:1.

The degree of needling (no. of penetrations) is correlatable to the stiffness of the resultant product after shrinking, with a higher needling leading to a greater stiffness or tension and in compression.

The heat treatment of layered felts required for preparation of devices herein described can be executed using a variety of well known restraining devices and heating devices. Restraining devices include but are not limited to tenter frames and welded clamping frames. Heating devices include any number of ovens and presses capable of uniformly heating the frame and felt to a temperature sufficient to induce shrinkage. Clamping and thermal treatments may be executed as batch or continuous processes. In any case, the thermal treatment must be conducted above the glass transition temperature of the fiber. In the case of the Lenzing P84 used in Examples I and II, thermal treatments in excess of 600° F. are required. Heating rate and treatment time must be specified in consideration of the fiber type, module weight and thickness, and characteristics of the clamping device and heating device.

Significant bonding occurs at fiber cross-over points in the shrinkable fiber layer. The extent and strength of bonds is not related to the degree of shrinkage per se, but is related to force application which often correlates to degree of shrinkage, but not invariably. The temperatures of heat shrinkage are not sufficient to fuse the crossing fibers or otherwise bond them without simultaneous application of suitable force.

There can be synergistic usage of the interneedled layers wherein one is used to constrain the other essentially laterally of their parallel (almost common) plane(s). For example, if an inter-needled module A-B with A of high shrinkage and B of lower shrinkage (or no shrink) characteristics is wrapped around a pipe or other cylindrical or arc former. Then shrinkage of A will constrain B to establish a higher density of B and lower thickness than would occur in a planar format.

Figure 4:
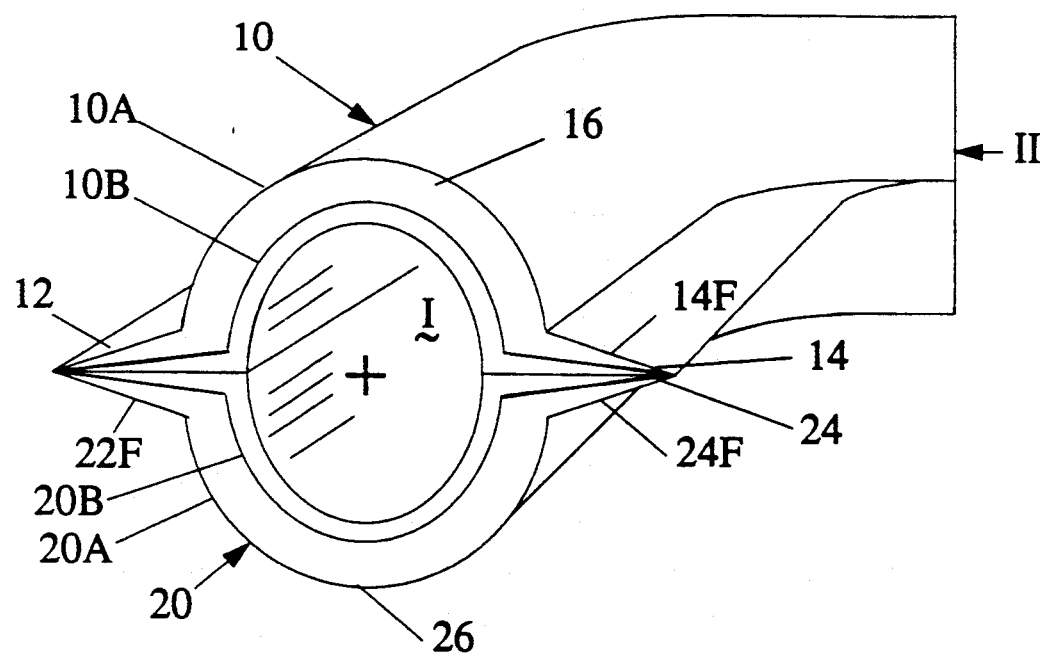
FIG. 4 is a cross-section isometric sketch of two complementary pieces produced in accordance with the FIG. 1 embodiment, molded and assembled.

Complex parts can also be formed after heat shrink processing. FIG. 4 is a part-section and part isometric view of a pair of complementary molded parts which together form a pipe elbow. The upper piece is 10 and has a low shrinkage layer 10A and high shrinkage layer 10B. The lower piece is 20 and has a low shrinkage layer 20A and a high shrinkage layer 20B. Each part as molded from a sheet form, subsequent to heat shrink processing of the sheets per se, has side flanges (121, for part 10, 222 for part 20) and a curved central portion (16 for part 10, 26 for part 20). The flanges are necked down at their outer edges while thickness of layers 10A, 10B, 20A, 20B is other essentially unmodified by molding. The molding effects a glaze-like surface of the faces 12F, 22F, 14F, 22F of the flange portions. The flanges are permanently assembled by adhesive bonding and/or by fastener means (bolts, clamps or clips, etc.) The elbow can be supported on a base, by hanger means or by ducts assembled to its openings I and II (e.g., by insertion of duct ends into such elbow openings or other couplings).

The molding is done under light forces at a temperature just above the glass transition temperature of the fiber components of the parts.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A structural or filler article of manufacture comprising one or more pairs of adjacent layers of heat-shrinkable fibers of different shrink characteristics in the respective layers which have been heat treated together to produce a differential degree of fiber shrinkage from layer to layer and consequent differential densification of the layers, the layers of at least one adjacent pair of layers being Z-axis linked by spanning pillars of Z-oriented fiber groups that span the layers.

2. Article as in claim 1 wherein the adjacent layers are of flat sheet form.

3. Article as in claim 1 wherein the adjacent layers are of curved sheet form.

4. Article as in claim 1 as made with a layer of essentially no shrinkage and a shrinkable layer connected thereto.

5. Article as in claim 1 as made with two heat shrinkable layers of substantially different shrinkage characteristics.

6. Article as in claim 1 comprising a single pair of adjacent such layers.

7. Article as in claim 1 comprising a triad of such layers.

8. Article as in any of claims 1, 6 or 7, comprising multiple modular sets of adjacent such layers in combination and co-acting to jointly provide composite properties, the modular sets being loosely bonded in comparison to the interlayer bonding of layers within each modular set.

9. Article as in claim 1 wherein the fibers are of a composition selected form the class represented by specification-defined structural formula I as clarified by specification-defined structures II through IV.

10. A process of utilizing heat shrinkable fibers to establish a controlled multi-density structure, comprising the steps of:
    (a) establishing adjacent layers of heat shrinkable fibers of differing shrink characteristics,
    (b) establishing interpenetration of fibers from one of said layers into the other, to form a laminate, and
    (c) restraining the laminate from shrinkage in at least one lateral dimension and heating the laminate above the glass transition temperature of fiber components of at least one of the layers.

11. Process of claim 10 wherein the laminate is heated above the glass transition temperature of both the adjacent layers.

12. Process of claim 10 wherein the laminate is molded subsequent to its heat shrink processing.

* * * * *